US006963266B2

(12) United States Patent
Palomäki et al.

(10) Patent No.: US 6,963,266 B2
(45) Date of Patent: Nov. 8, 2005

(54) LOCK SYSTEM, LOCK SYSTEM DEVICE AND METHOD OF CONFIGURING A LOCK SYSTEM

(75) Inventors: Hilkka Palomäki, Heinävaara (FI); Franck Chinellato, Moulins (FR); Henne Karlheinz, Gammertingen (DE); Dieter Kuchenbecker, Albstadt (DE); Rolf Norberg, Täby (SE); Lars Nilsson, Tyresö (SE); Juha Murtola, Joensuu (FI); Michel Noxfeld, Kållered (SE)

(73) Assignee: Assa Abloy AB, Stockholm (SE)

( * ) Notice: Subject to any disclaimer, the term of this patent is extended or adjusted under 35 U.S.C. 154(b) by 387 days.

(21) Appl. No.: 10/385,680

(22) Filed: Mar. 12, 2003

(65) Prior Publication Data

US 2003/0179074 A1 Sep. 25, 2003

(30) Foreign Application Priority Data

Mar. 19, 2002 (SE) ............................................. 0200827

(51) Int. Cl.[7] ........................ G05B 23/00; G05B 23/02; G05B 11/01

(52) U.S. Cl. ........................ 340/5.22; 340/3.1; 340/3.9; 700/19; 700/20; 709/201; 709/230

(58) Field of Search .............................. 340/5.22, 5.21, 340/3.1, 3.7, 3.9, 286.01; 700/19, 20; 709/201, 230

(56) References Cited

U.S. PATENT DOCUMENTS

| | | | | | |
|---|---|---|---|---|---|
| 5,537,104 | A | * | 7/1996 | Van Dort et al. | 340/3.71 |
| 5,591,950 | A | | 1/1997 | Imedio-Ocaña | |
| 5,774,058 | A | | 6/1998 | Henry et al. | |
| 5,909,183 | A | * | 6/1999 | Borgstahl et al. | 340/825.22 |
| 6,112,127 | A | * | 8/2000 | Bennett | 340/286.01 |
| 6,128,647 | A | | 10/2000 | Haury | |

* cited by examiner

*Primary Examiner*—Brian Zimmerman
*Assistant Examiner*—Clara Yang
(74) *Attorney, Agent, or Firm*—Sughrue Mion, PLLC

(57) ABSTRACT

A method of configuring a lock system comprising a plurality of lock system devices comprises the following steps: defining a plurality of command and status messages, wherein each of the messages has a specific function when received by a device, defining a plurality of device types, wherein each of the types can send predetermined command and status messages, sending a claiming message from each device, wherein the claiming message from a specific device comprises information relating to the predetermined messages that the specific device can send, and storing, in each of the devices, the information relating to the predetermined messages that every other device can send. By this method, a simple lock system can be set up without involvement of the person installing the system. A lock system and a lock system device using this method are also provided.

10 Claims, 4 Drawing Sheets

| Identifier | Data 1 | Data 2 | Data 3-4 | Data 5-6 | Data 7-8 |
|---|---|---|---|---|---|
| Message ID | Node ID | Attributes | Command Matrix | Status Matrix | Not Used |
| ID | 8 bits | 8 bits | 16 bits | 16 bits | 16 bits |

LOCK SYSTEM, LOCK SYSTEM DEVICE AND METHOD OF CONFIGURING A LOCK SYSTEM

FIELD OF INVENTION

The present invention relates generally to lock systems and more particularly to a self-configuring lock system comprising a plurality of different units, such as electronic or electro-mechanical locks, card readers, exit buttons, door openers etc.

BACKGROUND

Electronic and electro-mechanical lock systems are becoming increasingly complex. Besides the lock device itself, such as a lock cylinder, a lock system comprises auxiliary devices, such as sensors, panic bars, emergency power supplies etc. Many systems involve two doors with lock devices, like a pair door or a pair of interlocking doors used for e.g. security or climate control.

The interfacing between the different devices in a lock system is complex and requires installation by a person skilled not only in the technical field of locks but also in the field of electronics. The devices can be provided with different kinds of inputs/outputs and the function thereof differs from device to device.

One common way to configure an electronic lock system is to connect all devices to a common master unit, such as a computer. All devices are assigned a specific address by setting mechanical switches in positions corresponding to a desired address. By means of the master unit, the entire system can be set up so as to operate in a desired manner. However, this approach requires two installation steps, a first step wherein the devices are installed and wired, and a second step wherein the system is configured. Also, often two different persons are involved in the installation. A further drawback with this approach is that one wrong setting of switches can lead to time consuming searches for faults in the system.

SUMMARY OF THE INVENTION

An object of the present invention is to provide a self-configuring lock system wherein the prior art drawbacks are avoided and which requires no programming of the devices involved. Thus, an object is to simplify cabling through a wire system and to make the door environments to which it is applied easy to understand for the installer.

Another object of the present invention is to provide a self-configuring lock system wherein there is no central master unit.

The invention is based on the realisation that a self-configuring lock system can be provided by defining a number of allowed commands and having all devices send out claiming messages wherein the commands that can be transmitted by the different devices are negotiated.

According to the invention there are provided a method of configuring an electronic lock system as defined in claim 1. An electronic lock system device as defined in claim 8 and a lock system as defined in claim 10 are also provided.

By providing a lock system, wherein at start-up each connected device sends out a claiming message containing a list of commands that the device in question can send, a command matrix is created in every device. These matrixes are used to control the flow of commands in the lock system so as to create a functioning self-configuring electronic lock device system.

In a particularly preferred embodiment, the claiming messages are used for assigning different addresses to the devices connected to the system. Thereby, no setting of switches etc. is required during installation.

In another preferred embodiment, devices of the same product type are assigned to different device groups whereby a self-configuring two-door system is made possible.

Further preferred embodiments are defined by the dependent claims.

BRIEF DESCRIPTION OF DRAWINGS

The invention is now described, by way of example, with reference to the accompanying drawings, in which.

DETAILED DESCRIPTION OF THE INVENTION

In the following a detailed description of preferred embodiments of the present invention will be given.

In the present context, interconnectivity in a lock system between different devices means to enable simple connection of devices installed at a door. In most applications, a lock system or an environment comprises one or two doors. When the system comprises two doors it should be considered only doors with some kind of dependence, like a pair door or a pair of interlocking doors used for e.g. security or climate control.

In the present description, the term "lock system device" or simply "device" is intended to cover all types of devices comprised in an electronic lock system, such as card readers, panic buttons etc., and is thus not limited to devices comprising the lock itself.

Figure 1:
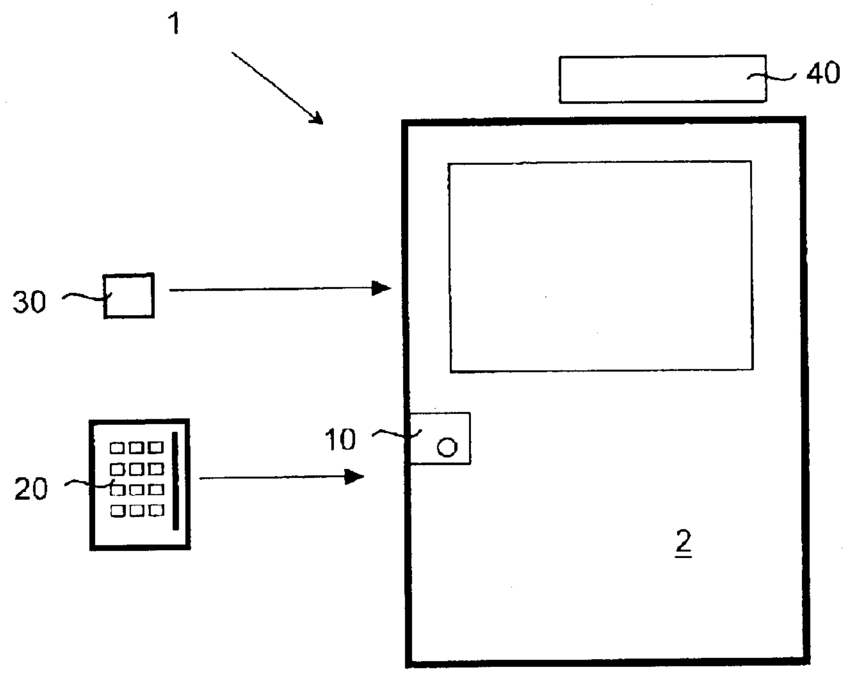
FIG. 1 is an overall view of a door comprising a typical electronic lock system.

A simple electronic lock system will now be described with reference to FIG. 1, showing a one-door system, generally designated 1. In a door 2, there is provided an electronic lock 10 of a kind conventionally found in electronic lock systems. By electronic lock is meant any kind of electrically actuated and controlled lock device including electro-mechanical locks. The lock is controlled by means of a card reader 20 installed on the outside of the door. On the inside there is provided an exit button 30 used by a person on the inside of the door for unlocking the same.

Figure 2:
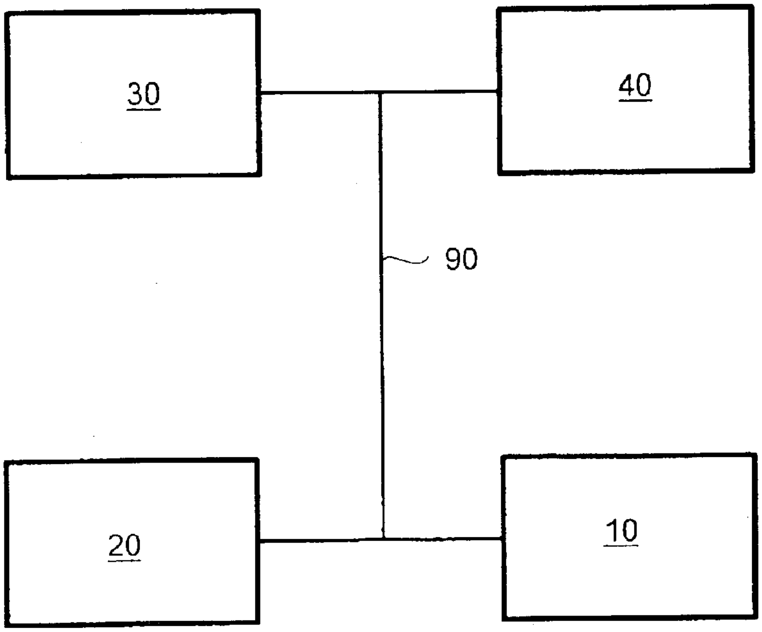
FIG. 2 is a block diagram showing connection between the different devices shown in FIG. 1.

The movement of the door between opened and closed positions is controlled by means of a door operator 40 with an integrated motion sensor. All devices shown in FIG. 1 are interconnected by means of a two-wire cabling making up a bus 90. This is shown in FIG. 2, which is a block diagram showing all the devices comprised in the lock system of FIG.

1. As is evident from FIG. 2, there is no central "master" unit in the system as is usually found in conventional electronic lock systems. Instead all devices set up themselves so as to provide an interconnected system. This is made possible by the interconnectivity provided by the present invention, as will be described below.

Most devices in a lock system according to the invention have different functions. However, they all have a common hardware and software structure which will be described below.

Figure 3:
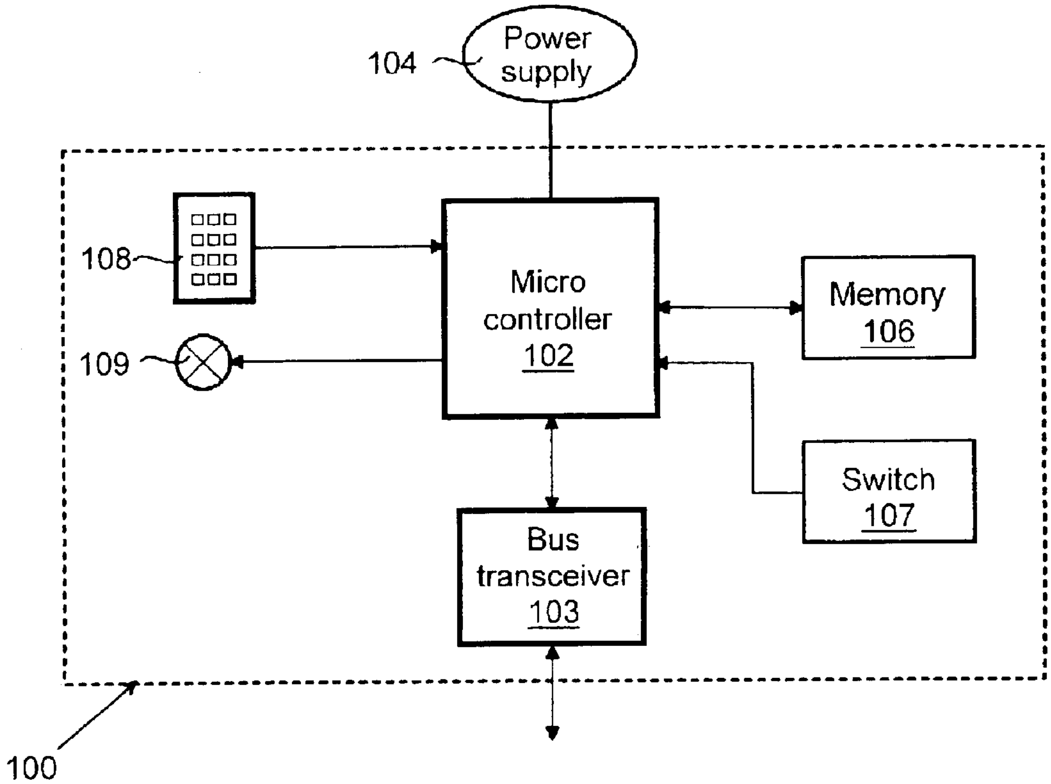
FIG. 3 is a block diagram showing the configuration of a lock system device according to the invention.

In FIG. 3, there is shown a lock system device, indicated by the dashed line and generally designated 100.

The device comprises a single chip micro controller 102 connected to a bus transceiver 103 arranged to be connected to the bus 90 shown in FIG. 2. The micro controller 102 is powered by means of a power supply 104 arranged as an external supply connected to the device supplying a voltage of 12 or 24 VDC.

The micro controller itself contains some kind of electronic memory, such as a Read only memory (ROM). However, a non-volatile memory 106 is connected to the micro controller for storage of non volatile data, such as system operational parameter data and/or diagnostic data. There is also provided a switch 107 for indicating whether the device belongs to either or both of two defined device groups, as will be explained in detail below with reference to FIGS. 6 and 7.

Further elements, such as a key pad 108 or a light indicator 109 can also be provided in the device 100.

Devices can be in one of two different modes: pre-operational mode and operational mode. When a device is connected to the power supply, a boot-up sequence is initiated, wherein it is in the pre-operational mode. After the boot-up sequence is completed, the device has been put into operational mode.

In a network of devices of the kind described herein, every device must have a unique node identification (node ID) before operational stage. Because there is no central unit taking care of the configuration of the system, all devices identify themselves during the boot-up sequence and this identification includes an address claiming procedure wherein all devices connected to the system are assigned a unique address. The address claiming procedure is performed in any convenient way and the exact way it is performed constitutes no part of the present invention. However, in order for the procedure to operate correctly, each device must have a unique serial number stored in memory.

A lock system can be classified either as very simple or as simple. As long as only one device of each product type is used, the system is very simple and all devices belong to one group. The group concept will be described further below with reference to FIGS. 6 and 7. A simple system comprises two devices of at least one product group and these devices must be distinguished by allocating them to different groups. A very simple or simple system will always configure itself according to some basic rules.

Lock system devices are divided into three different device classes: activators, actuators, and sensors.

An activator is any device that sends commands to an actuator. Examples of an activator can be an exit push button, card reader, panic exit button etc. The activator is also responsible for the access related timing of a lock system.

An actuator is a device that performs an action, usually some kind of mechanical activity like releasing a clutch or opening a door. It can also be a buzzer or flashlight. Some actuators need to send access commands, see below, and are thus also activators.

A sensor provides no access related information, only sensor status information. An example thereof is a door operator safety switch.

In the example above the electronic lock 10 and the door operator 40 are actuators while the card reader 20 and the exit button 30 are activators.

The functional device connections of the system shown in FIG. 1 will now be described with reference to FIG. 4, wherein "Activator 1" corresponds to the card reader 20, "Activator 2" corresponds to the exit button 30, "Actuator 1" corresponds to the lock 10, and "Actuator 2" corresponds to the door operator 40.

A device can not receive data from another device if there is no logical connection therebetween (as opposed to the physical connections shown in FIG. 2). A logical connection is in essence a "decision" to receive messages from an already known device on the bus. During the address claiming procedure during the pre-operational stage, each device on the bus will decide what other devices to establish logical connections to. The claiming device will send a message matrix in the claiming message. Thus the other devices on the bus can decide which commands and status messages to respond to.

Figure 4:
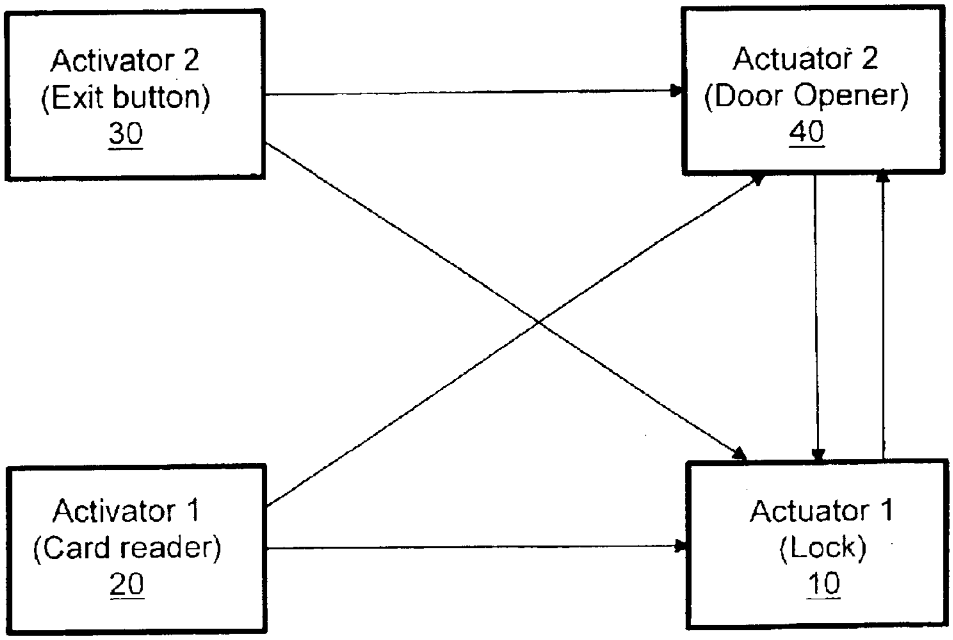
FIG. 4 shows the functional device connection of the system shown in FIG. 1.

The logical connections in FIG. 4 are represented by arrows indicating the direction of allowed messages carried through the connection in question. It is seen that the activators can send but not receive messages while the actuators can both send and receive messages.

In FIG. 4, Actuator 1 has set up logical connections to all the other devices, i.e., three connections. Each connection can carry a number of different messages. There are specific rules to define which messages to respond to and which to discard. For example, a lock device, i.e., Actuator 1 in FIG. 3, will discard an "Id device event" message and accept an "Unlock" message. Messages will be explained in more detail in the following.

All messages are listed below. The assigned message index value is unique and the messages are related to specific devices. Any device can send any message, but not all devices will listen; this is controlled by the device configuration.

The messages are divided into two categories: command and status messages, wherein commands messages have a message index range of 0–127 and status messages have a message index range of 128–255. These messages are shown in tables 2 and 3 below.

Figures 5, 6:
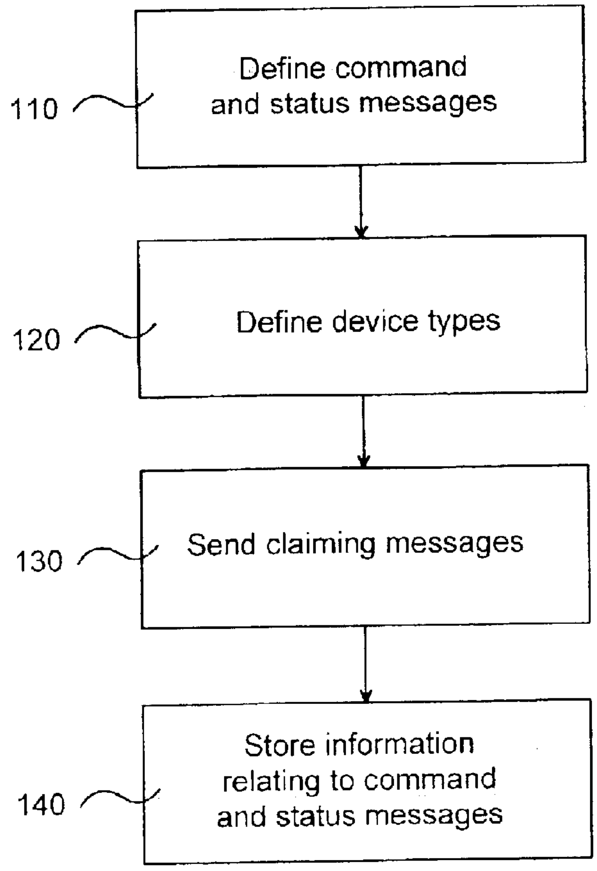
FIG. 5 shows the structure of a claiming message according to the invention.
FIG. 6 is a flow chart of the major steps of the method according to the invention.

The structure of a claming message is shown in FIG. 5. It carries 32 bits describing which messages can be sent from that device. These 32 bits are divided into 16 bits for the command messages and 16 bits for status messages.

It has been mentioned above that a claiming message is sent by each device during the address claiming procedure. Inside this claiming message there are additional attributes to identify the functionality of the claiming device.

Data1

This is the Node ID of the claiming device.

Data2—Attributes

In the attributes there is the position of the group switch. If the device is configured to be a multi-group device this should be reflected in the claiming message. Attributes are shown in table 1 below.

TABLE 1

| Attributes | | | |
|---|---|---|---|
| Bit | Attribute | Value | Comment |
| 0–1 | Group Switch | 0 = Not Used<br>1 = Group 1<br>2 = Group 2<br>3 = Group 1 + Group 2 | Status of group switch of the claiming device.<br>Status of the multi-group setting. |
| 2 | Master | 0 = Not NMT master<br>1 = This is NMT master | The claiming device claims NMT master function in the system (handled by API). |
| 3 | Sub-device | 0 = No sub-devices follow<br>1 = Sub-devices follow | Indicates if the claiming device is claiming a sub-device address. |
| 4–7 | Reserved | 0 | Not used. |

The use of the group switch will be explained further below with reference to FIGS. 6 and 7.

Data3–4—Command Matrix

This is a binary array, representing up to 16 control messages that the claiming device can send. If the bit value is "1" then corresponding message can be sent.

TABLE 2

| Command Matrix | | |
|---|---|---|
| Bit | Message index | Message text |
| 0 | 0 | Emergency Command |
| 1 | 1 | Emergency Control Command |
| 2 | 2 | Door Control Command |
| 3 | 3 | Inhibit Command |
| 4 | 4 | Identification Device Control Command |
| 5–15 | 5–127 | Not used (set to 0). |

Data5–6—Status Matrix

This is a binary array, representing up to 16 status messages that the claiming device can send. If the bit value is "1" then corresponding message can be sent.

TABLE 3

| Status Matrix | | |
|---|---|---|
| Bit | Message index | Message text |
| 0 | 128 | Locking Device Status |
| 1 | 129 | General Device Status |
| 2 | 130 | Debug Status |
| 3 | 131 | Exit Device Counter |
| 4 | 132 | Door Operator Status, Revolving door status |
| 5 | 133 | Identification Device tag data. |
| 6 | 134 | Identification Device event. |
| 7 | 135 | System Power Status |
| 8 | 136 | System Temperature Sensor Status |
| 9–15 | 137–255 | Not Used (set to 0). |

During self-configuration, each device will build up a matrix showing which devices that can send which control status messages.

The method of configuring or setting up a lock system thus comprises the steps 110–140 shown in the flow chart of FIG. 6.

The heart in the lock system is the door control command. The Door Control command is a complex command-set, sent to all actuators that handle door access in the door environment. This function controls the entire door state. All devices have to comply with a predefined set of instructions and rules. The door control command structure is given in table 4 below.

TABLE 4

| Door Control Commands | | | | |
|---|---|---|---|---|
| Identifier | Data 1 | Data 2 | Data 3 | |
| Message ID | Index 02 | Door Control 8 bits | Attributes 8 bits | |

| Door Control | Size | Bit no. | Value | Comment |
|---|---|---|---|---|
| Security Lock | 1 bit | 0 | 0 = Locked<br>1 = Unlocked | Security Lock will wait for door closed and locking device "locked" status. |
| Locking Device | 1 bit | 1 | 0 = Lock<br>1 = Unlock | If a security lock is present the locking device will wait for the unlocked status. |
| Door Operator | 1 bit | 2 | 0 = Closed<br>1 = Open | Door operator will open the door when all locking devices are in unlocked state. |
| Hold/Release | 1 bit | 3 | 0 = Release<br>1 = Hold | This command is only for door holding devices. |
| Inactive | 1 bit | 4 | 0 = Active<br>1 = Inactive | Act only on active commands. |
| — | 3 bits | 5–7 | 0 | Not Used |
| — | 6 bits | 0–5 | 0 | Not Used |
| Tamper/Sabotage | 1 bit | 6 | 0 = 0K<br>1 = Tamper/Sab. | Activator is tampered, or sabotaged. |
| Error | 1 bit | 7 | 0 = Device OK.<br>1 = General error. | Internal error. |

There can be multiple door control commands in a system. Since each actuator will be aware of all activators present on the bus, it can collect the door control messages from all activators, and through a prioritisation process calculate the actual door state. Only active messages will take part in the priority process.

Any activator can be inhibited except for panic/emergency exit devices. The inhibited activator will still send data on the bus, but it will indicate (inside message) that the device is inhibited. By default all activators are in active mode (not inhibited). In any system there must be only one device that control the inhibit state of the system's activators.

An exemplary configuration and operation of the lock device system shown in FIG. 1 will now be given.

After power-on, each device will send a claiming message in which information is passed to all other devices regarding Node id, Device Attributes, and Message Connection Matrix.

Since all connections are logical only, each device has to tell all other devices what messages it will send. It is up to each device to decide which messages are received and which are discarded.

During automatic configuration there are a total of 32 messages that can be sent from a device, represented as binary data in the claiming message, where the logical value "0" means "don't connect message" and logical "1" means "connect message".

There is no particular order considered between devices, when making connections. Each device has an internal factory-programmed unique serial number. This number is used to decide who is sending a claiming message at any given time.

Assume that the devices shown in FIG. 1 will claim in the following order, thereby being assigned a corresponding node ID:

| Node ID | Device |
|---|---|
| 1 | Exit button 30 |
| 2 | Locking device 10 |
| 3 | Door operator 40 |
| 4 | Card reader 20 |

After power-on, this results in a sequence of events that will be described in detail in the following.

The exit button 30 sends its claiming message wherein it claims node id 1. The following connection matrix is also sent:

Command: 0004 $_{hex}$, Status: 0004 $_{hex}$.

The command matrix corresponds to the following binary sequence:

0000 0000 0000 0100

Referring to table 2 and table 3 for details of the command and status matrix, respectively, this indicates, when read from right to left, i.e., from bit 0 to bit 15, that the exit button can send command no. 3, Door Control Command. This command can be received by all other devices in the system.

The status information has the same content, i.e., the exit button can send status message no. 3, Debug Status. However, this status information is only used by a computer unit connected to the system during trouble shooting, for example, and will be discarded by all devices normally connected to the system.

The claiming message sent by the exit button will thus result in the following configuration of the system:

| Messages sent by these devices . . . | Node ID | . . . are received by these devices: Lock 10 | Card reader 20 | Exit button 30 | operator 40 |
|---|---|---|---|---|---|
| Lock 10 | | | | | |
| Card reader 20 | | | | | |
| Exit button 30 | 1 | Door Control Command | Door Control Command | | Door Control Command |
| Door operator 40 | | | | | |

The Lock device 10 now claims node id 2 and sends the following connection matrix:

Command: 0001 $_{hex}$. Status: 0005 $_{hex}$

This connection matrix corresponds to the following messages:

Command message: Door Control Command

Status messages: Locking Device Status, Debug Status

The Door Control Command and the Locking Device Status messages can be received by all other devices. However, as already mentioned, the Debug status message is discarded by all devices.

This results in the following configuration:

| Messages sent by sent by these devices . . . | Node ID | . . . are received by these devices: Lock 10 | Card reader 20 | Exit button 30 | Door operator 40 |
|---|---|---|---|---|---|
| Lock 10 | 2 | | Door Control Command, Locking Device Status | Door Control Com mand, Locking Device Status | Door Control Command, Locking Device Status |
| Card reader 20 | | | | | |
| Exit button 30 | 1 | Door Control Command | Door Control Command | | Door Control Command |
| Door operator 40 | | | | | |

Door operator 40 now claims node ID 3 and sends the following connection matrix:

Command: 0005 $_{hex}$, Status: 0014 $_{hex}$

This device will send Emergency Command and Door Control Command as well as Debug Status and Door Operator Status. However, Debug status is discarded by all devices and the Lock 10 will discard the Emergency Command.

Finally, Card Reader 20 claims node ID 4 and sends the following connection matrix:

Command: 001F $_{hex}$, Status: 0064 $_{hex}$

This device will send Emergency Control Command, Door Control Command, Inhibit Command and Identification Device Control Command as well as the status messages Debug Status, Identification Device tag data, and Identification Device event. However, the other devices will discard the Emergency Control Command, Identification Device Control Command as well as all the status messages. Also, the Lock 10 will discard the Inhibit Command.

This results in the following configuration:

| Messages sent by sent by these devices . . . | Node ID | . . . are received by these devices: Lock 10 | Card reader 20 | Exit button 30 | Door operator 40 |
|---|---|---|---|---|---|
| Lock 10 | 2 | | Door Control Command, Locking Device Status | Door Control Command, Locking Device Status | Door Control Command, Locking Device Status |
| Card reader 20 | 4 | Door Control Command | | Door Control Command, Inhibit Command | Door Control Command, Inhibit Command |
| Exit button 30 | 1 | Door Control Command | Door Control Command | | Door Control Command |

-continued

| Messages | | . . . are received by these devices | | | |
|---|---|---|---|---|---|
| sent by sent by these devices . . . | Node ID | Lock 10 | Card reader 20 | Exit button 30 | Door operator 40 |
| Door operator 40 | 3 | Door Control Command, Door Operator Status | Emergency Command, Door Control Command, Door Operator Status | Emergency Command, Door Control Command, Door Operator Status | |

Now all connections are established.

As can be understood from the example above:

Each device will send out a message containing a "bit pattern" which define which messages that will be transmitted from the claiming device.

Each device will decide whether to establish connections of up to 32 messages from other devices or not, depending on device type and functionality.

Figure 7:
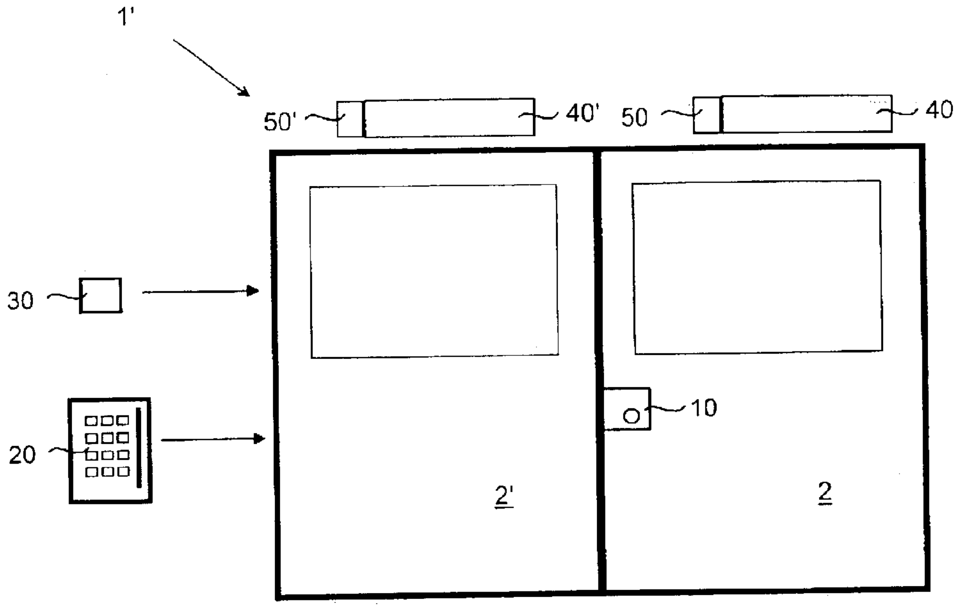
FIG. 7 is an overall view of a lock system comprising two related doors.

In FIG. 7 there is shown a double door system comprising, besides the devices shown in FIG. 1, a second door operator 40' and a first and a second door operator safety sensor 50, 50'. In such a system with two devices having the same function, i.e., being of the same product type, a group switch is used to identify a group to which a device belongs. Devices within the same group can interact while devices in different groups will not interact. By means of the group switch, a fairly complex lock system can be installed by means of the inventive self-configuration process.

Figure 8:
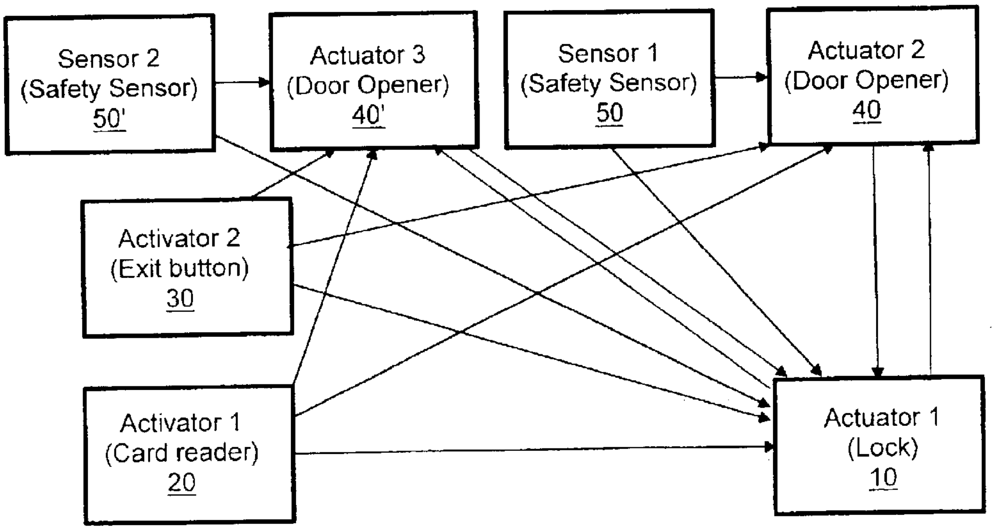
FIG. 8 is a block diagram showing the functional device connection of the devices comprised in the system of FIG. 7.

In the system shown in FIG. 7, the first door operator 40 and the first safety sensor 50 belong to a first group of devices while the second devices 40' and 50' of the same kind belong to a second group of devices. All other devices belong both to the first and the second groups. The group belonging is communicated by means of the attributes information in the claiming message, see table 1, wherein it can be seen that there are three possible selections: Group 1, Group 2, or Group 1+Group 2. Thus the functional devices interconnections will look as in FIG. 8. It is seen there that Sensor 1, i.e. the first safety sensor 50, can send messages to Actuator 2, i.e., the first door opener 40, but not to Actuator 3, i.e., the second door opener 40'. The reverse is true for Sensor 2, i.e., the second safety sensor 50'. This will prevent a configuration wherein the first sensor sends messages to the second opener or the second sensor sends messages to the first opener etc.

Preferred embodiments of a lock system according to the invention and a method of configuring the same have been described. A person skilled in the art realises that this could be varied within the scope of the appended claims.

Embodiments comprising one or two doors have been described. It will be appreciated that, for more advanced solutions, an intelligent door controller or a special configuration tool can be used to set up the system.

Although externally powered devices have been described, there can also be provided an internal battery either as primary or secondary power supply.

The door openers and the door opener safety sensors in FIG. 7 have been described as two different devices. However, they can be physically integrated into one single device with a single connection to the interconnecting bus 90. Even in that case, they still act as two different logical units on the bus and one of the devices functions as a sub-devices, as indicated by the attributes shown in table 3. This feature allows for an even easier installation of the lock system while maintaining the flexibility and functionality of the self-configuration.

What is claimed is:

1. A method of configuring a lock system comprising a plurality of lock system devices, said method comprising the following steps:

a) defining a plurality of command and status messages, wherein each of said command and status messages has a specific function when received by a device, b) defining a plurality of device types, wherein each of said device types can send predetermined command and status messages of said plurality of command and status messages, c) sending a claiming message from each of said plurality of devices, wherein said claiming message from a specific device comprises information relating to said predetermined command and status messages that said specific device can send, and d) storing, in each of said plurality of devices, said information relating to said predetermined command and status messages that every other device can send.

2. The method according to claim 1, wherein each of said command and status messages are assigned a unique index value.

3. The method according to claim 1, wherein each of said command and status messages are related to specific device types.

4. The method according to claim 1, wherein said claiming message comprises an attribute indicator indicating belonging to either or both of two different groups (Group 1, Group 2).

5. The method according to claim 1, wherein said claiming message comprises a binary field wherein each bit specifies whether a corresponding message can be sent.

6. The method according to claim 1, wherein said claiming message comprises an attribute indicator indicating whether a sub-device will follow or not.

7. The method according to claim 1, comprising classifying each device as either activator, actuator, or sensor, wherein an activator is arranged to send commands to an actuator, an actuator is arranged to perform a mechanical activity, and a sensor is arranged to provide sensor status information.

8. An electronic lock system device, comprising:

a processing unit, an electronic memory connected to said processing unit, an input/output port, wherein said device, when powered on, sends a claiming message on said input/output port comprising information relating to predetermined command and status messages that said device can send, and stores information from claiming messages received through said input/output port relating to said predetermined command and status messages that other devices can send.

9. The device according to claim 8, comprising a group switch indicating the belonging to either or both of two different groups.

10. A lock system comprising a plurality of lock system devices, all of said devices being interconnected by means of a bus, and wherein each of said devices comprises:

a processing unit, an electronic memory connected to said processing unit, and an input/output port, and wherein each device, when powered on, sends a claiming message on said input/output port comprising information relating to predetermined command and status messages that said device can send, and stores information from claiming messages received through said input/output port relating to said predetermined command and status messages that other devices can send.

* * * * *